(12) United States Patent
Codilian

(10) Patent No.: US 6,972,926 B1
(45) Date of Patent: Dec. 6, 2005

(54) DISK DRIVE HAVING DISK DRIVE HOUSING INCLUDING AIRFLOW SUPPRESSOR PORTION

(75) Inventor: Raffi Codilian, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 322 days.

(21) Appl. No.: 10/062,955

(22) Filed: Jan. 31, 2002

(51) Int. Cl.⁷ ............................................. G11B 33/14
(52) U.S. Cl. ................................................. 360/97.02
(58) Field of Search ......................... 360/97.02, 97.01, 360/88, 255.6, 234, 97.03, 86, 98.01, 128

(56) References Cited

U.S. PATENT DOCUMENTS

| | | | |
|---|---|---|---|
| 5,134,530 A | 7/1992 | Hall ......................... | 360/97.03 |
| 5,453,890 A | 9/1995 | Takegami et al. ......... | 360/97.02 |
| 5,541,791 A | 7/1996 | Yamasaki et al. ......... | 360/256.1 |
| 6,266,208 B1 | 7/2001 | Voights ..................... | 360/97.02 |
| 6,271,987 B1 | 8/2001 | Allsup et al. ............. | 360/97.03 |
| 6,362,937 B1 * | 3/2002 | Gibbs et al. .............. | 360/256.1 |
| 6,424,487 B2 | 7/2002 | Nagl et al. ................ | 360/97.01 |
| 6,600,625 B1 * | 7/2003 | Munninghoff et al. ... | 360/97.02 |
| 2002/0063991 A1 * | 5/2002 | Machcha et al. ......... | 360/97.03 |
| 2002/0071202 A1 * | 6/2002 | Myokan et al. .......... | 360/97.02 |
| 2002/0149876 A1 * | 10/2002 | Sakata et al. ............. | 360/97.02 |
| 2003/0002206 A1 * | 1/2003 | Long et al. ............... | 360/97.02 |

* cited by examiner

Primary Examiner—Julie Anne Watko
(74) Attorney, Agent, or Firm—Stetina Brunda Garred & Brucker

(57) ABSTRACT

According to the present invention, there is provided a disk drive that includes a housing including a body portion and an airflow suppressor portion extending from the body portion. The disk drive includes a disk that includes an inner disk edge, an outer disk edge and a disk surface. The disk drive includes a head stack assembly rotatably coupled to the body portion. The head stack assembly includes an actuator arm including a first arm surface disposed adjacent the disk surface and an opposing second arm surface. The disk drive includes upstream and downstream regions. The airflow suppressor portion is radially disposed substantially between the inner and outer disk edges within the upstream region and extends entirely from the housing body portion beyond the second arm surface towards the disk surface for modifying disk rotation induced airflow upon the head stack assembly.

38 Claims, 3 Drawing Sheets

DISK DRIVE HAVING DISK DRIVE HOUSING INCLUDING AIRFLOW SUPPRESSOR PORTION

CROSS-REFERENCE TO RELATED APPLICATIONS

This application is related to U.S. application Ser. No. 09/872,193 entitled "DISK DRIVE HAVING AIRFLOW SUPPRESSOR COMB FOR REDUCED DISK ROTATION INDUCED AIRFLOW" filed on May 31, 2001, incorporated herein by reference, and U.S. application Ser. No. 09/872,236 entitled "DISK DRIVE HAVING AIRFLOW SUPPRESSOR COMB WITH CURVED EXTENSION FOR REDUCED DISK ROTATION INDUCED AIRFLOW" filed on May 31, 2001, incorporated herein by reference.

BACKGROUND OF THE INVENTION

1. Field of the Invention

The present invention relates generally to disk drives, and in particular to a disk drive having a disk drive housing including an airflow suppressor portion.

2. Description of the Prior Art

The typical hard disk drive includes a head disk assembly (HDA) and a printed circuit board assembly (CBA) attached to a disk drive base of the HDA. The head disk assembly includes a disk drive housing having the disk drive base and a cover, at least one magnetic disk, a spindle motor for rotating the disk, and a head stack assembly (HSA) that includes a transducer head supported by a slider for reading and writing data to and from the disk.

The spindle motor includes a spindle motor hub that is rotatably attached to the disk drive base. The spindle motor hub has an outer hub flange that supports a lowermost one of the disks. Additional disks may be stacked and separated with annular disk spacers that are disposed about the spindle motor hub. The spindle motor typically includes a spindle motor base that is attached to the disk drive base. A shaft is coupled to the spindle motor base and the spindle motor hub surrounds the shaft. The spindle motor hub may be rotatably coupled to the shaft and therefore the spindle motor base typically via a pair of bearing sets.

The head stack assembly has an actuator assembly having at least one head or slider, typically several, for reading and writing data to and from the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The head stack assembly includes the actuator assembly and a flex circuit cable assembly attached to the actuator assembly. A conventional "rotary" actuator assembly (also referred to as "rotary actuator" or simply "actuator") typically comprises an actuator body, a pivot bearing cartridge, a coil portion that extends from one side of the actuator body to interact with one or more permanent magnets to form a voice coil motor, and one or more actuator arms which extend from an opposite side of the actuator body to a distal end of the actuator assembly. The actuator body includes a bore and the pivot bearing cartridge engaged within the bore for allowing the actuator body to rotate between limited positions. The actuator assembly is controllably rotated so as to move the heads relative to the disks for reading and writing operations with respect to the tracks contained on the disks. The heads are electrically connected with the flex cable assembly for communication with the printed circuit board assembly.

A topic of concern is the desire to reduce the effects of airflow generated within the disk drive due to rotation of the disks. Of particular concern is the occurrence of turbulent airflow that may tend to excite a resonance response of the actuator assembly. This results in an increase in the percent off-track values of the associated head. Further, such disk rotation induced airflow may result in a force applied to the actuator assembly, i.e., windage. In addition, such disk rotation induced airflow may result in vibration of the disk or disk flutter. Accordingly, there is a need in the art for an improved disk drive for mitigation of such disk rotation induced airflow in comparison to the prior art.

SUMMARY OF THE INVENTION

According to the present invention, there is provided a disk drive that includes a disk drive housing including a housing body portion and an airflow suppressor portion extending from the housing body portion. The disk drive further includes a disk rotatably coupled to and adjacent the housing body portion. The disk includes an inner disk edge, an outer disk edge and a disk surface disposed between the inner and outer disk edges. The disk drive further includes a head stack assembly rotatably coupled to the housing body portion about a pivot axis. The head stack assembly includes an actuator arm including a first arm surface disposed adjacent the disk surface and an opposing second arm surface. The head stack assembly is sized and configured to pivot the actuator arm. The disk drive further includes upstream and downstream regions disposed along the disk surface. The upstream and downstream regions are divided by a plane perpendicular to the disk surface through the pivot axis and tangent to the inner disk edge adjacentmost the actuator arm. The upstream region includes disk positions that rotate towards the actuator arm. The airflow suppressor portion is radially disposed substantially between the inner and outer disk edges within the upstream region and extends substantially entirely from the housing body portion beyond the second arm surface towards the disk surface for modifying disk rotation induced airflow upon the head stack assembly adjacent to the disk surface.

According to various embodiment, the airflow suppressor portion may include a trailing side disposed and an opposing leading side. The trailing side may be adjacent the actuator arm. In an embodiment, the trailing side and the leading side are generally parallel to each other. In another embodiment, the trailing side and the leading side are tapered with respect to each other from the inner disk edge towards the outer disk edge. The leading side may be aligned generally tangential with the inner disk edge. The disk surface may include an inner non-data annular region. The airflow suppressor portion may include a main section disposed substantially between the inner and outer disk edges and an inner disk limiter section extending from the main section towards the inner non-data annular region. The main section and the inner disk limiter section may be integrally formed. The disk surface includes an outer non-data annular region. The airflow suppressor portion may include a main section disposed substantially between the inner and outer disk edges and an outer disk limiter section extending from the main section towards the outer non-data annular region. The main section and the outer disk limiter section may be integrally formed. The airflow suppressor portion may be integrally formed with the housing body portion. The airflow suppressor portion may be formed of a metal material and may include a non-conductive coating. In another embodiment, the airflow suppressor portion may be formed of a plastic material. The housing body portion may take the form of a disk drive base and/or a disk drive cover.

DESCRIPTION OF THE PREFERRED EMBODIMENTS

Figure 1:
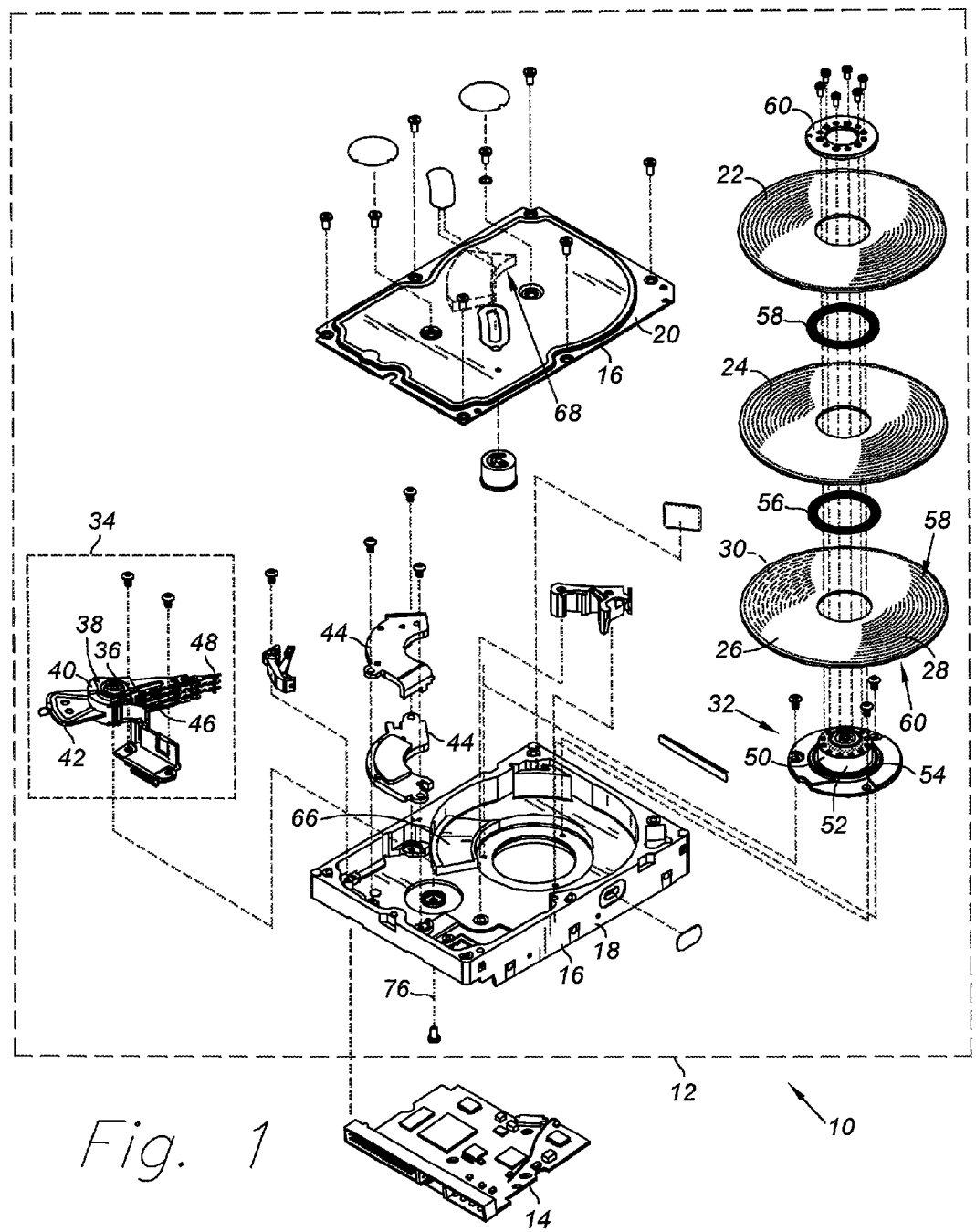
FIG. 1 is an exploded perspective view of a disk drive as constructed in accordance with the present invention.

Referring now to the drawings wherein the showings are for purposes of illustrating preferred embodiments of the present invention only, and not for purposes of limiting the same, FIGS. 1–6 illustrate a disk drive in accordance with the aspects of the present invention.

Referring now to FIG. 1 there is depicted an exploded perspective view of a disk drive 10 constructed in accordance with an aspect of the present invention. In the embodiment shown, the disk drive 10 includes a head disk assembly (HDA) 12 and a printed circuit board assembly (PCBA) 14. The head disk assembly 12 includes a disk drive housing 16 that may include a disk drive base 18 and/or a cover 20 as additionally depicted in FIGS. 2 and 3. The disk drive housing 16 contains magnetic disks 22, 24, 26. Additional or fewer disks may be utilized. Each magnetic disk 22, 24, 26 contains a plurality of tracks for storing data. The magnetic disks 22, 24, 26 may be two-sided, and thus for example, the magnetic disk 26 is shown having a track 28 on an upper facing side and a track 30 (shown in phantom) on a lower facing side. The head disk assembly 12 further includes a spindle motor 32 for rotating the magnetic disks 22, 24, 26. The head disk assembly 12 further includes a head stack assembly 34 and a pivot bearing cartridge 36. The head stack assembly 34 includes a rotary actuator 38.

The rotary actuator 38 includes an actuator body 40 that has a bore and the pivot bearing cartridge 36 engaged within the bore for facilitating the rotary actuator 38 to rotate between limited positions. The rotary actuator 38 further includes a coil portion 42 that extends from one side of the actuator body 40 to interact with a pair of permanent magnets 44 to form a voice coil motor for pivoting the rotary actuator 38. A plurality of actuator arms, the lowermost one of which being denoted 46, extend from an opposite side of the actuator body 40. Individual actuator arms 46a–d are depicted in the enlarged cross sectional view of FIG. 4. Still referring to FIG. 1, as the disks 22, 24, 26 may be two sided, each of the actuator arms 46a–d include either one or two suspension assemblies associated with the adjacent sides of the disks 22, 24, 26. Each suspension assembly includes a head (the uppermost one being denoted 48) for reading and writing data to and from the disks 22, 24, 26.

Figure 4:
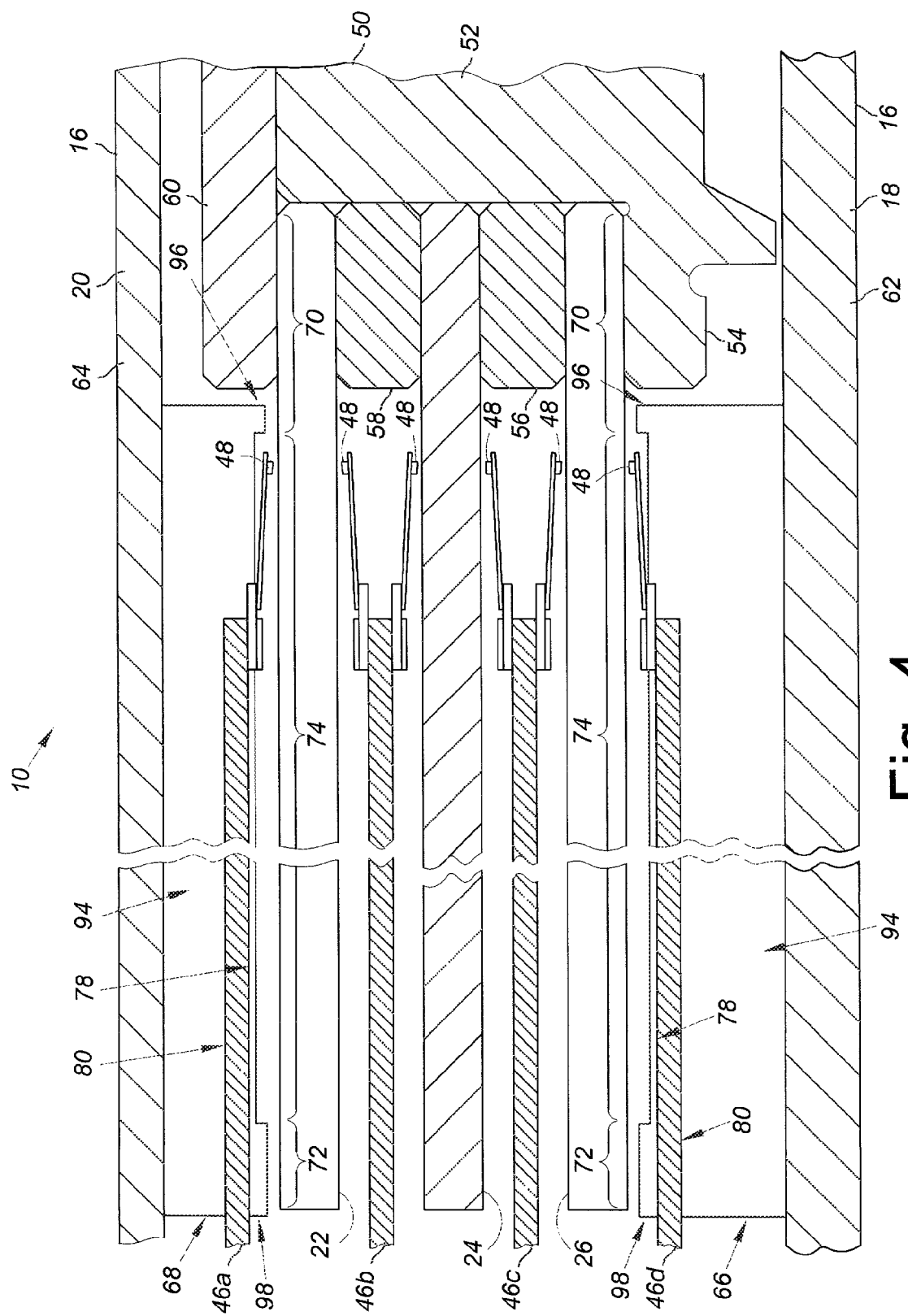
FIG. 4 is an enlarged cross sectional view of a portion of the disk drive of FIG. 1 as assembled including the disk drive cover and base with airflow suppressor portions shown in phantom.

Referring additionally to the cross-sectional view of a portion of the disk drive 10 of FIG. 4, the spindle motor 32 includes a spindle motor hub 50 that is rotatably attached to the disk drive base 18. The spindle motor hub 50 has a hub body 52 and a hub flange 54 that extends from the hub body 52. The hub flange 54 supports a lowermost one of the disks, namely disk 26. The remaining disks 22, 24 are stacked and separated with annular disk spacers 56, 58 that are disposed about the hub body 52. A disk clamp 60 is attached about the spindle motor hub 50 and is utilized to apply a clamping force against the topmost disk 22 for securing all the disks 22, 24, 26 to the spindle motor hub 50. The spindle motor 32 typically includes a spindle motor base that is attached to the disk drive base 12. A shaft is coupled to the spindle motor base and the spindle motor hub 500 surrounds the shaft. The spindle motor hub 50 may be rotatably coupled to the shaft and therefore the spindle motor base typically via a pair of bearing sets. A stator is positioned about the shaft and is attached to the spindle motor base. A magnet element is attached at a bottom portion of the hub flange 54. The stator includes windings that selectively conduct current to create a magnetic field that interacts with the various poles of the magnet element. Such interaction results in forces applied to the spindle motor hub 50 that tend to rotate the spindle motor hub 50 and the attached disks 22, 24, 26.

An aspect of the invention can be regarded as the disk drive 10 that includes the disk drive housing 16. The disk drive housing 16 may include the disk drive base 18 and the cover 20. The disk drive housing 16 may further include a housing body portion, such as a housing body portion 62 and the housing body portion 64. In the embodiment shown, the disk drive base 18 includes the housing body portion 62, and the cover 20 includes the housing body portion 64. The disk drive housing 16 further includes an airflow suppressor portion, such as an airflow suppressor portion 66 and an airflow suppressor portion 68. The airflow suppressor portion 66 extends from the housing body portion 62, and the airflow suppressor portion 68 extends from the housing to body portion 64. As mentioned above, the present invention contemplates inclusion of the disk drive housing 16. As the disk drive housing 16 may take the form of the disk drive base 18 or the cover 20 for example, the present invention may be practiced with just the disk drive base 18 with the airflow suppressor portion 66 or just the cover 20 with the airflow suppressor portion 68. However, in the embodiment shown, both the airflow suppressor portions 66, 68 are included as respectively attached to the disk drive base 18 and the cover 20.

The disk drive 10 further includes a disk such as disk 22 and disk 26, rotatably coupled to and adjacent to a respective one of the housing body portions 62, 64. The disks 22, 26 are both rotatably coupled to the disk drive base 18 with the spindle motor 32. Further as the disk drive base 18 is attached to the cover 20, it is contemplated that both the disks 22, 26 are rotatably coupled to the cover 20 and the disk drive housing 16. The disks 22, 26 each include an inner disk edge 70, an outer disk edge 72 and a disk surface 74 disposed between the inner and outer disk edges 70, 72. The disk drive 10 further includes the head stack assembly 34 rotatably coupled to the housing body portion 66 about a pivot axis 76. Further, as the disk drive base 18 is attached to the cover 20, it is contemplated that head stack assembly 34 is rotatably coupled to the housing body portion 68 of the cover 20.

Figure 2:
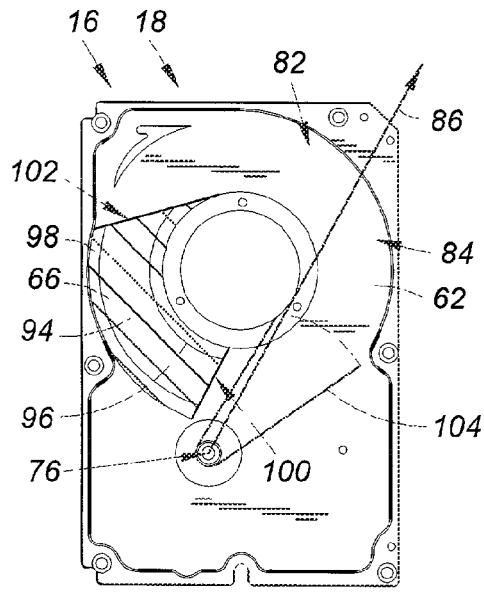
FIG. 2 is a plan view of an interior of a disk drive base of the disk drive of FIG. 1 including an airflow suppressor portion.
Figure 3:
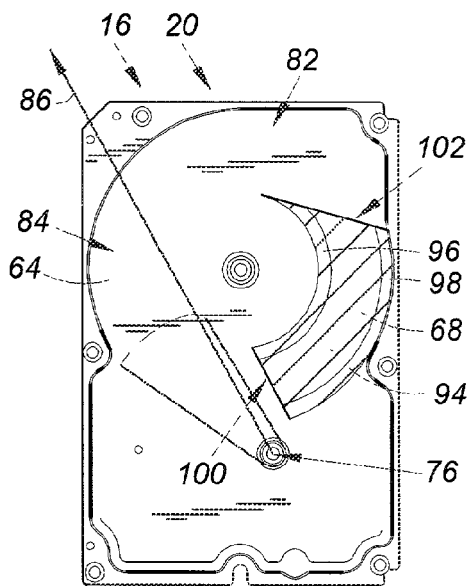
FIG. 3 is a plan view of an interior of a disk drive cover of the disk drive of FIG. 1 including an airflow suppressor portion.

The head stack assembly 34 includes an actuator arm, such as the actuator arms 46a,d. Each of the actuator arms 46a,d includes a first arm surface 78 disposed adjacent the disk surface 74 and an opposing second arm surface 80. The head stack assembly 34 is sized and configured to pivot the actuator arms 46a,d. As indicated in FIGS. 2 and 3 in relation to the disk drive base 18 and cover 20, the disk drive 10 further includes upstream and downstream regions 82, 84 disposed along each of the disk surfaces 74 of disks 22, 26. The upstream and downstream regions 82, 84 are divided by a plane perpendicular to the disk surfaces 74 through the pivot axis 76 and tangent to the inner disk edges 70 adjacentmost to the actuator arms 46a–d. This is indicated in FIGS. 2 and 3 by the dividing line 86. In the views of FIGS. 1 and 2, the disks 22, 24, 26 are contemplated to rotate counter-clockwise. In the view of FIG. 3, as this is a plan view of the cover 20 as seen from within the disk drive 10, the disks 22, 24, 26 are contemplated to rotate clockwise. The upstream region 82 includes disk positions that rotate towards the actuator arms 46a,d.

The airflow suppressor portions 66, 68 are each radially disposed substantially between the inner and outer disk edges 70, 72 within the upstream region 82 and extend substantially entirely from the respective housing body portions 62, 64 beyond the second arm surfaces 80 towards the disk surfaces 74 for modifying disk rotation induced airflow upon the head stack assembly 34 adjacent to the disk surface 74.

The airflow suppressor portions 66, 68 being each radially disposed substantially between the inner and outer disk edges 70 refers to the airflow suppressor portions extending at least half of a radial distance between the inner and outer disk edges 70, 72. In addition, the airflow suppressor portions 66, 68 extending substantially entirely from the respective housing body portions 62, 64 refers to at least half of the surface area of the airflow suppressor portions 66, 68 facing the respective body portions 62, 64 being in contact with the housing body portions 62, 64.

As mentioned above, the airflow suppressor portions 66, 68 each extend beyond the second arm surfaces 80 towards the disk surfaces 74. Referring to the cross sectional view of FIG. 4, the airflow suppressor portion 68 (shown in phantom) extends from the cover 20 beyond the second arm surface 80 of the actuator arm 46a towards the disk surface 74 of the disk 22. In the embodiment shown the airflow suppressor portion 68 additionally extends beyond the first arm surface 78 as well. Similarly, the airflow suppressor portion 66 (shown in phantom) extends from the disk drive base 18 beyond the second arm surface 80 of the actuator arm 46d towards the disk surface 74 of the disk 26. In the embodiment shown the airflow suppressor portion 66 additionally extends beyond the first arm surface 78 as well.

According to various embodiments, as shown in FIG. 4, the disk surfaces 74 of disks 22, 26 which are disposed adjacent the airflow suppressor portions 66, 68 may each include an inner non-data annular region 88, an outer non-data annular region 90, and a data region 92 disposed therebetween (as indicted by brackets). The airflow suppressor portions 66, 68 each include a main section 94 disposed substantially between the inner and outer disk edges 70, 72.

The airflow suppressor portions 66, 68 may each include an inner disk limiter section 96 extending from the main section 94 towards the inner non-data annular region 88. Though undesirable, it is contemplated that the hub body 52 (and therefore the disks 22, 26) may vertically move relative to the airflow suppressor portions 66, 68. This may result from play in a bearing assembly of the spindle motor hub 50 for example. To the extent that the vertical movement is sufficient to cause contact between the disks 22, 26 and the airflow suppressor portions 66, 68, the inner disk limiter sections 96 are configured to contact the disks 22, 26. In particular, the inner disk limiter sections 96 are configured to contact the inner non-data regions 88. Thus, contact between the airflow suppressor portions 66, 68 and the data regions 92 of the disks 22, 26 may be avoided.

Further, the airflow suppressor portions 66, 68 may each include an outer disk limiter section 98 extending from the main section 94 towards the outer non-data annular region 90. It is contemplated that the outer disk edges 72 of disks 22, 26 may undesirably vertically move as may be the case during certain resonance modes of the disks 22, 26 or when the disk drive 10 is subjected to a shock event for example. To the extent that such vertical movement is sufficient to cause contact between the disks 22, 26 and the airflow suppressor portions 66, 68, the outer disk limiter sections 98 are configured to contact the disks 22, 26. In particular, the outer disk limiter sections 98 are configured to contact the outer non-data regions 90. Thus, contact between the airflow suppressor portions 66, 68 and the data regions 92 of the disks 22, 26 may be avoided.

In one embodiment, the inner and outer disk limiter sections 96, 98 may be formed of a plastic material. In this regard, it is contemplated that the inner and outer disk limiter sections 96, 98 may be separately formed from the main sections 94 and may take the form of a gasket like polyamide adhesive tape for example. Such a material may have certain nonconductive electrical properties to mitigate electrostatic discharge but may also provide a degree of mechanical damping. In another embodiment, the inner and outer disk limiter sections 96, 98 may be formed of a metal material. For example, the inner and outer disk limiter sections 96, 98 may be integrally formed with the main sections 94 which are also formed of the same metal material. In order to guard against electrostatic discharge, the inner and outer disk limiter sections 96, 98 may include a nonconductive coating.

The airflow suppressor portions 66, 68 may be formed of a metal material and may include a non-conductive coating. In another embodiment, the airflow suppressor portions 66, 68 may be formed of a plastic material. The airflow suppressor portions 66, 68 may be respectively integrally formed with the housing body portions 62, 64. In this regard, where the disk drive base 18 and the cover 20 are molded or stamped, the details of the airflow suppressor portions 66, 68 may be efficiently manufactured. In another arrangement, the airflow suppressor portions 66, 68 may be separately formed from the housing body portions 62, 64 and subsequently attached to the housing body portions 62, 64.

While the airflow suppressor portions 66, 68 are shown as having smooth and flat surface features, various surface contours are contemplated. For example, channels or grooving may be formed upon the airflow suppressor portions 66, 68 and may be used to guide airflow or affect air pressures adjacent such surfaces. Further, while the airflow suppressor portions 66, 68 are shown to be solid structures, it is contemplated that openings and cavities may be formed through or in the airflow suppressor portions 66, 68 and my be used to guide airflow or affect air pressures.

A boundary 104 of the rotary actuator 38 is indicated with dashed lines in FIGS. 2 and 3. This represents the locations of the rotary actuator 38 in its extreme positions, ranging from an orientation with the heads 48 adjacent the inner disk edges 70 to the outer disk edges 72, and the volume occupied by the rotary actuator 38. The airflow suppressor portions 66, 68 may each include a trailing side 100 disposed towards the actuator arms 46*a,d* and an opposing leading side 102. The trailing sides 100 are disposed adjacent the rotary actuator 38 in its extreme position with the heads 48 adjacent the inner disk edges 70. Preferably, the trailing sides 100 are within an inch of the boundary 104. Further, the trailing sides 100 need not be parallel to the adjacentmost portion of the boundary 104 as shown, but may be disposed at other angular orientations. For example, the spacing between the trailing sides 100 and that portion of the boundary 104 may decrease radially outward. The leading sides 102 may be disposed at different angular orientations with respect to the trailing sides 100. In another embodiment, the trailing side and the leading side are tapered with respect to each other from the inner disk edges 70 towards the outer disk edges 72. In the embodiment shown, the leading sides 102 are aligned generally tangential with the inner disk edges 70. Such tangential alignment guides rotation induced airflow from the inner disk edges 70 towards the outer disk edges 72.

Figure 5:
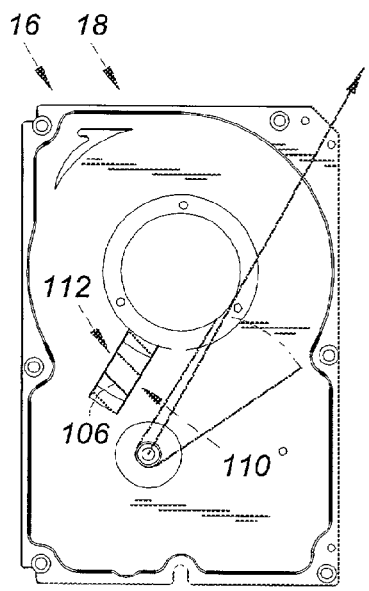
FIG. 5 is a plan view of an interior of a disk drive base similar to that of FIG. 2, however, with a different embodiment of an airflow suppressor portion.
Figure 6:
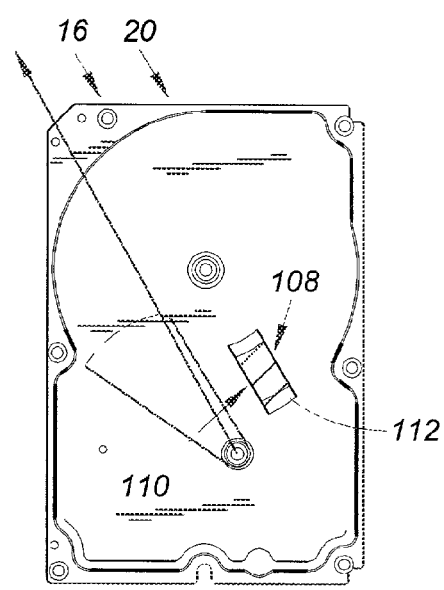
FIG. 6 is a plan view of an interior of a disk drive cover similar to that of FIG. 3, however, with a different embodiment of an airflow suppressor portion.

Referring now to FIGS. 5 and 6, there is depicted another embodiment disk drive base 18 and cover 20 of the disk drive 10. FIGS. 5 and 6 are similar to that of FIGS. 2 and 3 with the substitution of airflow suppressor portions 106, 108 in place of the airflow suppressor portions 66, 68. The airflow suppressor portions 106, 108 respectively extend from the disk drive base 18 and cover 20. The airflow suppressor portions 106, 108 each include a trailing side 110 and an opposing leading side 112. In this embodiment, the trailing side 110 and the leading side 112 are generally parallel to each other. Further, as the trailing and leading sides 110, 112 are relatively close together, in this embodiment the amount of volume occupied by the airflow suppressor portions 106, 108 is substantially smaller than that of the airflow suppressor portions 66, 68.

I claim:

1. A disk drive comprising:
   a disk drive housing including a housing body portion and an airflow suppressor portion extending from the housing body portion;
   a disk rotatably coupled to and adjacent the housing body portion, the disk including an inner disk edge, an outer disk edge and a disk surface disposed between the inner and outer disk edges, the disk surface including an inner non-data annular region;
   a head stack assembly rotatably coupled to the housing body portion about a pivot axis, the head stack assembly including an actuator arm including a first arm surface disposed adjacent the disk surface and an opposing second arm surface, the head stack assembly being sized and configured to pivot the actuator arm; and
   upstream and downstream regions disposed along the disk surface, the upstream and downstream regions being divided by a plane perpendicular to the disk surface through the pivot axis and tangent to the inner disk edge adjacentmost the actuator arm, the upstream region including disk positions which rotate towards the actuator arm;
   wherein the airflow suppressor portion is radially disposed substantially between the inner and outer disk edges within the upstream region and extends substantially entirely from the housing body portion beyond the second arm surface towards the disk surface for modifying disk rotation induced airflow upon the head stack assembly adjacent to the disk surface, the airflow suppressor portion includes a main section disposed substantially between the inner and outer disk edges and an inner disk limiter section extending from the main section towards the inner non-data annular region.

2. The disk drive of claim 1 wherein the airflow suppressor portion includes a trailing side disposed and an opposing leading side.

3. The disk drive of claim 2 wherein the trailing side is disposed adjacent the actuator arm with the actuator arm in a parked position.

4. The disk drive of claim 2 wherein the trailing side and the leading side are generally parallel to each other.

5. The disk drive of claim 2 wherein the trailing side and the leading side are tapered with respect to each other from the inner disk edge towards the outer disk edge.

6. The disk drive of claim 2 wherein the leading side is aligned generally tangential with the inner disk edge.

7. The disk drive of claim 1 wherein the main section and the inner disk limiter section are integrally formed.

8. The disk drive of claim 1 wherein the disk surface includes an outer non-data annular region, the airflow suppressor portion includes a main section disposed substantially between the inner and outer disk edges and an outer disk limiter section extending from the main section towards the outer non-data annular region.

9. The disk drive of claim 8 wherein the main section and the outer disk limiter section are integrally formed.

10. The disk drive of claim 1 wherein the airflow suppressor portion is integrally formed with the housing body portion.

11. The disk drive of claim 1 wherein the airflow suppressor portion is formed of a metal material.

12. The disk drive of claim 11 wherein the airflow suppressor portion includes a non-conductive coating.

13. The disk drive of claim 1 wherein the airflow suppressor portion is formed of a plastic material.

14. The disk drive of claim 1 wherein the housing body portion is a disk drive base.

15. The disk drive of claim 1 wherein the housing body portion is a disk drive cover.

16. A disk drive comprising:
   a disk drive housing including a housing body portion and an airflow suppressor portion extending from the housing body portion;
   a disk rotatably coupled to and adjacent the housing body portion, the disk including an inner disk edge, an outer disk edge and a disk surface disposed between the inner and outer disk edges, the disk surface including an outer non-data annular region; and
   a head stack assembly rotatably coupled to the housing body portion about a pivot axis, the head stack assembly including an actuator arm including a first arm surface disposed adjacent the disk surface and an opposing second arm surface, the head stack assembly being sized and configured to pivot the actuator arm; and
   upstream and downstream regions disposed along the disk surface, the upstream and downstream regions being divided by a plane perpendicular to the disk surface through the pivot axis and tangent to the inner disk edge adjacentmost the actuator arm, the upstream region including disk positions which rotate towards the actuator arm;
   wherein the airflow suppressor portion is radially disposed substantially between the inner and outer disk edges within the upstream region and extends substantially entirely from the housing body portion beyond the second arm surface towards the disk surface for modifying disk rotation induced airflow upon the head stack assembly adjacent to the disk surface, the airflow suppressor portion includes a main section disposed substantially between the inner and outer disk edges and an outer disk limiter section extending from the main section towards the outer non-data annular region.

17. The disk drive of claim 16 wherein the airflow suppressor portion includes a trailing side disposed and an opposing leading side.

18. The disk drive of claim 17 wherein the trailing side is disposed adjacent the actuator arm with the actuator arm in a parked position.

19. The disk drive of claim 17 wherein the trailing side and the leading side are generally parallel to each other.

20. The disk drive of claim 17 wherein the trailing side and the leading side are tapered with respect to each other from the inner disk edge towards the outer disk edge.

21. The disk drive of claim 17 wherein the leading side is aligned generally tangential with the inner disk edge.

22. The disk drive of claim 16 wherein the disk surface includes an inner non-data annular region, the airflow suppressor portion includes a main section disposed substantially between the inner and outer disk edges and an inner disk limiter section extending from the main section towards the inner non-data annular region.

23. The disk drive of claim 22 wherein the main section and the inner disk limiter section are integrally formed.

24. The disk drive of claim 16 wherein the main section and the outer disk limiter section are integrally formed.

25. The disk drive of claim 16 wherein the airflow suppressor portion is integrally formed with the housing body portion.

26. The disk drive of claim 16 wherein the airflow suppressor portion is formed of a metal material.

27. The disk drive of claim 26 wherein the airflow suppressor portion includes a non-conductive coating.

28. The disk drive of claim 16 wherein the airflow suppressor portion is formed of a plastic material.

29. The disk drive of claim 16 wherein the housing body portion is a disk drive base.

30. The disk drive of claim 16 wherein the housing body portion is a disk drive cover.

31. A disk drive comprising:
   a disk drive housing including a housing body portion and an airflow suppressor portion extending from the housing body portion, the airflow suppressor portion being formed of a metal material with a non-conductive coating;
   a disk rotatably coupled to and adjacent the housing body portion, the disk including an inner disk edge, an outer disk edge and a disk surface disposed between the inner and outer disk edges; and
   a head stack assembly rotatably coupled to the housing body portion about a pivot axis, the head stack assembly including an actuator arm including a first arm surface disposed adjacent the disk surface and an opposing second arm surface, the head stack assembly being sized and configured to pivot the actuator arm; and
   upstream and downstream regions disposed along the disk surface, the upstream and downstream regions being divided by a plane perpendicular to the disk surface through the pivot axis and tangent to the inner disk edge adjacentmost the actuator arm, the upstream region including disk positions which rotate towards the actuator arm;
   wherein the airflow suppressor portion is radially disposed substantially between the inner and outer disk edges within the upstream region and extends substantially entirely from the housing body portion beyond the second arm surface towards the disk surface for modifying disk rotation induced airflow upon the head stack assembly adjacent to the disk surface.

32. The disk drive of claim 31 wherein the disk surface includes an inner non-data annular region, the airflow suppressor portion includes a main section disposed substantially between the inner and outer disk edges and an inner disk limiter section extending from the main section towards the inner non-data annular region.

33. The disk drive of claim 32 wherein the main section and the inner disk limiter section are integrally formed.

34. The disk drive of claim 31 wherein the disk surface includes an outer non-data annular region, the airflow suppressor portion includes a main section disposed substantially between the inner and outer disk edges and an outer disk limiter section extending from the main section towards the outer non-data annular region.

35. The disk drive of claim 34 wherein the main section and the outer disk limiter section are integrally formed.

36. The disk drive of claim 31 wherein the airflow suppressor portion is integrally formed with the housing body portion.

37. The disk drive of claim 31 wherein the housing body portion is a disk drive base.

38. The disk drive of claim 31 wherein the housing body portion is a disk drive cover.

* * * * *